June 27, 1967 T. K. BRIDGES ET AL 3,327,614
BEVERAGE-EXTRACTING AND-DISPENSING MACHINE
Filed Nov. 5, 1962 3 Sheets-Sheet 1
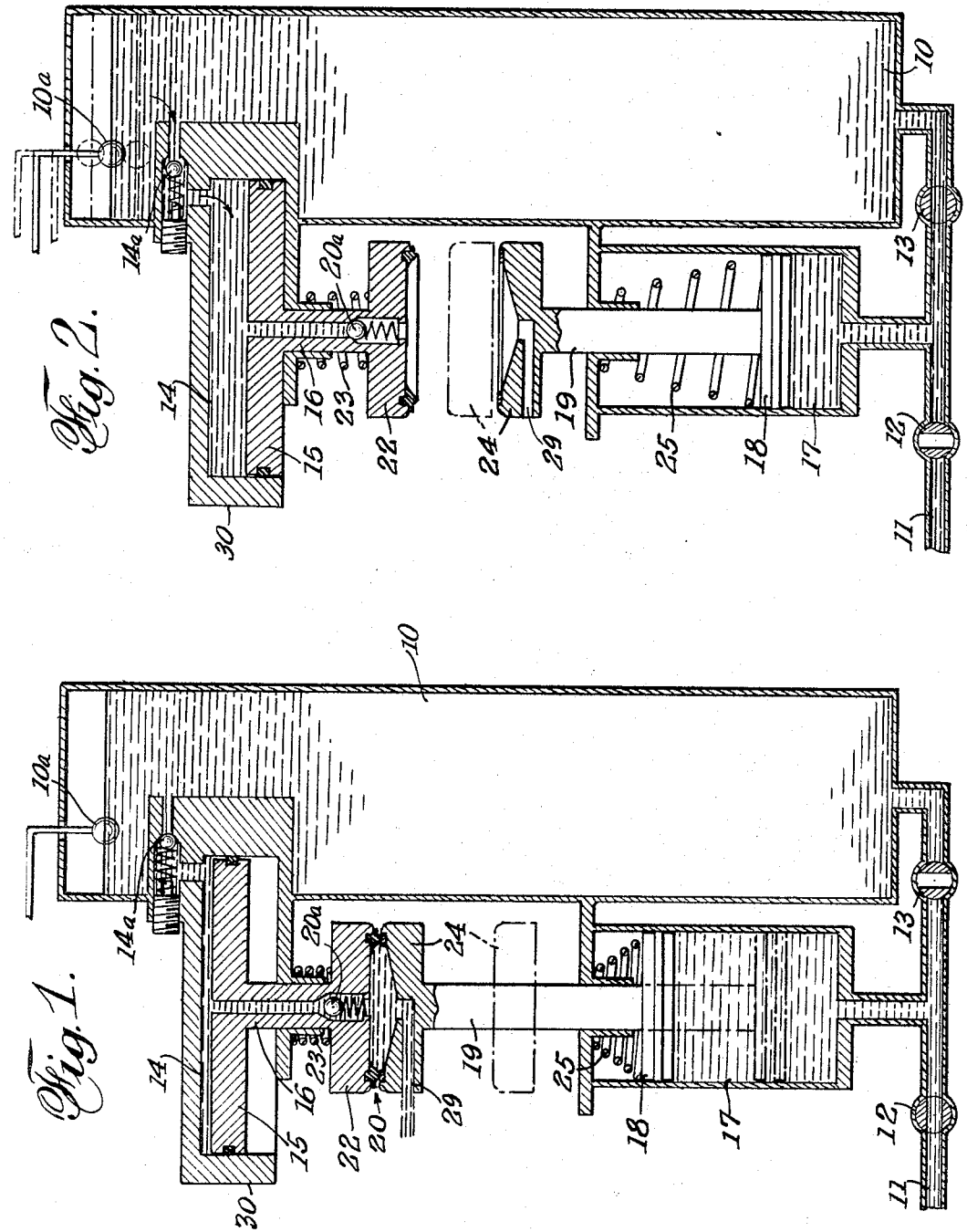
INVENTORS
THOMAS K. BRIDGES
HOWARD G. NOURSE
BY
C. G. Stratton
ATTORNEY

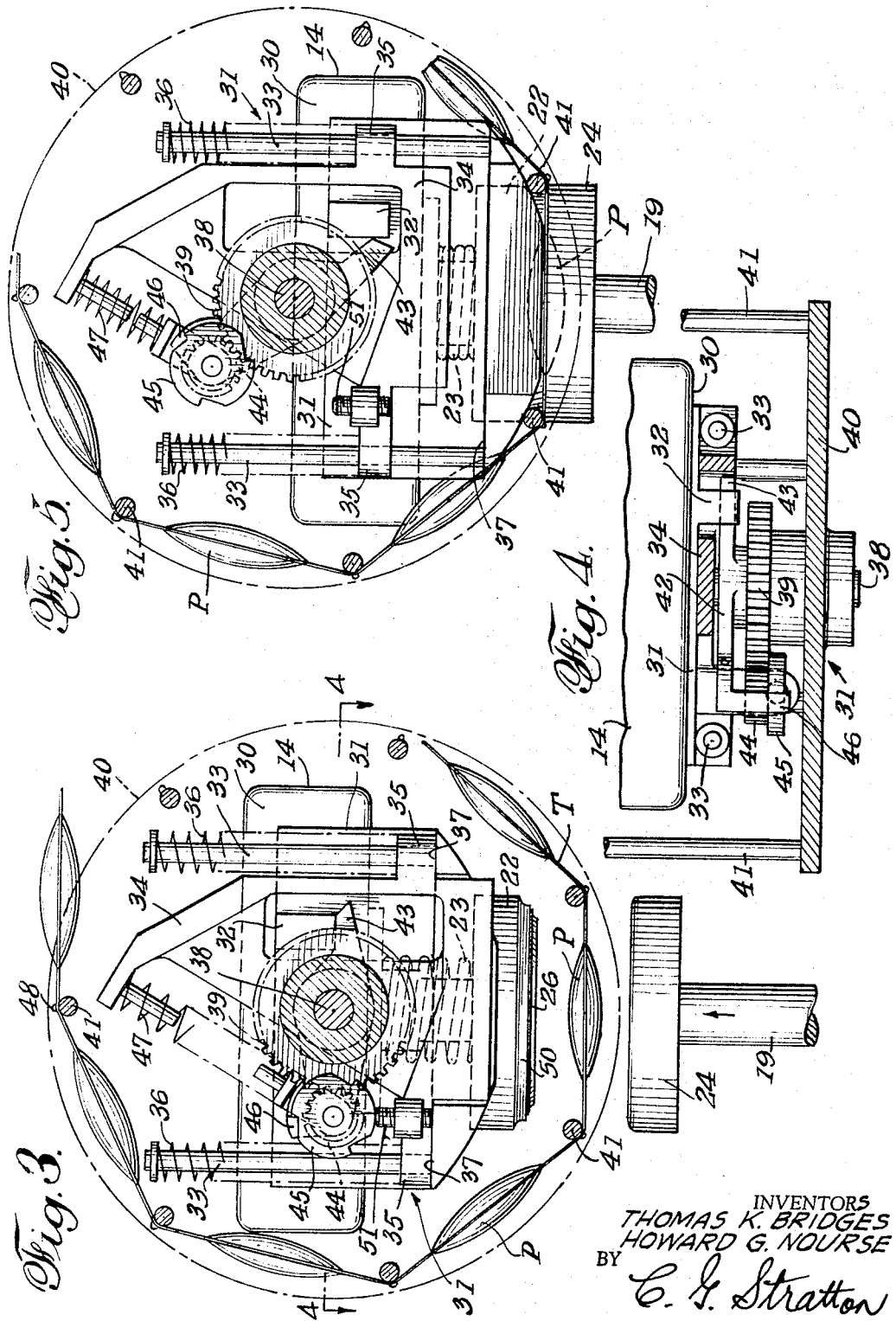

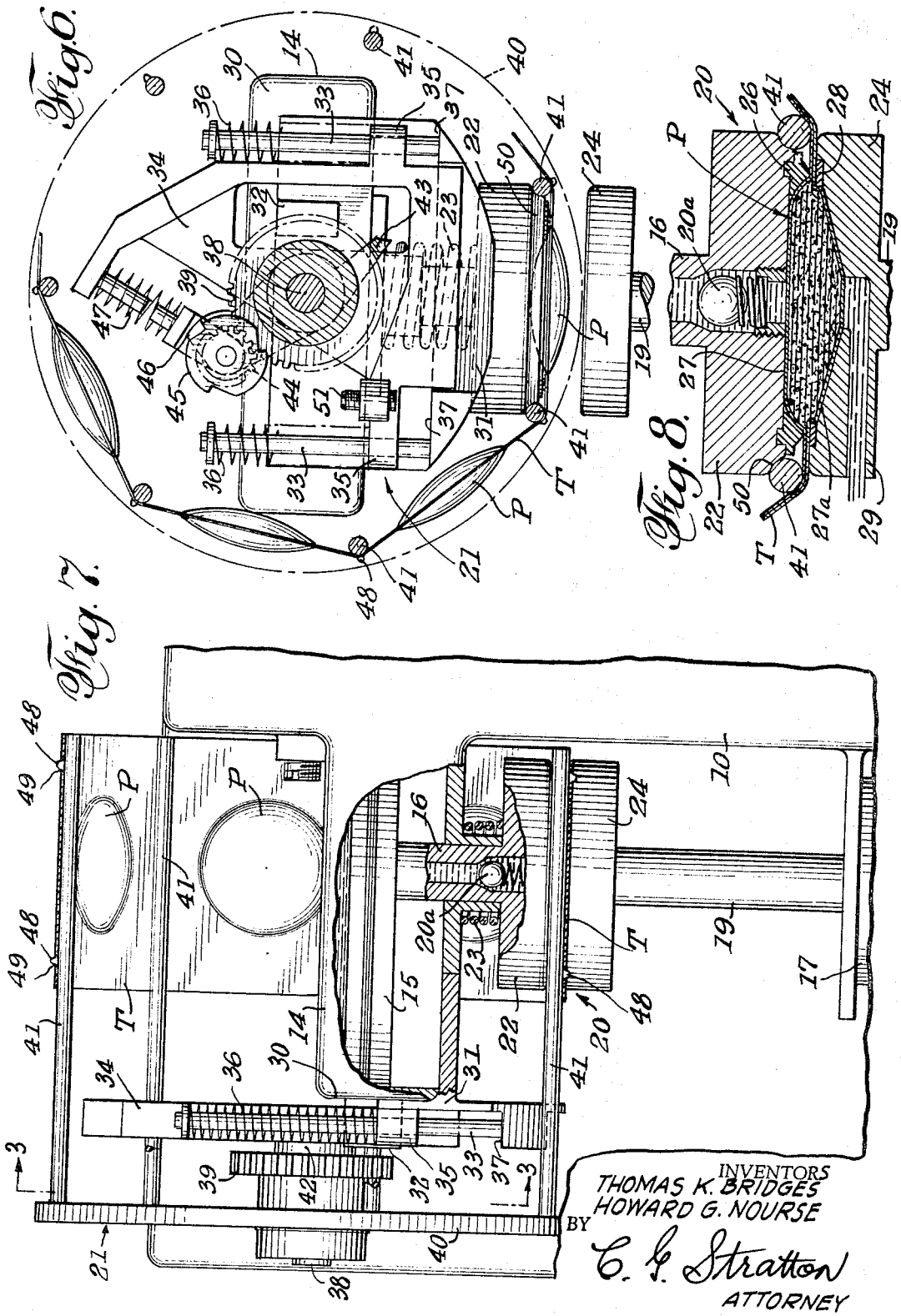

United States Patent Office 3,327,614
Patented June 27, 1967

3,327,614
BEVERAGE-EXTRACTING AND -DISPENSING
MACHINE
Thomas K. Bridges, 3703 W. 102nd St., and Howard G. Nourse, 2402 W. 115th Place, both of Inglewood, Calif. 90303
Filed Nov. 5, 1962, Ser. No. 235,300
10 Claims. (Cl. 99—283)

This invention relates to a machine for removing the extract or essence from a dry, pre-packaged preparation, such as coffee, and dispensing the same in water as a beverage.

An object of the invention is to provide a machine, as above characterized, that dispenses a hot beverage by passing an accurately measured volume of heated water through a packaged preparation while the latter remains in its package.

Another object of the invention is to provide a beverage-extracting and -dispensing machine that uses pre-packaged, brewable material in a series of pods connected by a filter band or belt and successively forces hot water through said pods to extract the essence from the material in the pods and successively dispenses such essence-provided liquid.

Another object of the invention is to provide a machine for the purpose referred to that is safe in operation, in that the supply of heated water is at no time under pressure greater than the pressure of the water supplied thereto, it being contemplated to use heated tap water under regulated pressure for the beverage dispensed and also for providing the power used for producing the infusion of liquid, as above indicated.

A further object of the invention is to provide a machine, as above, for effecting advance or feed of the mentioned filter belt to bring the successive pods of material into infusion or brewing position solely under the power or pressure of the tap water.

A still further object of the invention is to provide a beverage-brewing and -dispensing machine that uses tap water, or water from any suitable supply, to first provide the power for an infusion operation, and then replenish the storage of water in the machine to replace the water used during such infusion operation.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a semi-schematic vertical sectional view illustrating the power stroke of the present machine.

FIG. 2 is a similar view showing the machine at the end of the return action when transferring the water used during the power stroke to storage to replace water that was dispensed during the power stroke, said view also showing the manner of replenishing evaporation in the storage.

FIG. 3 is an enlarged vertical sectional view of means operated by the pressure of water during the power stroke for effecting intermittent feed of the cartridge filter belt, the view being taken on the plane of line 3—3 of FIG. 7 and showing said feed means in the position thereof corresponding to the machine as in FIG. 2.

FIG. 4 is a horizontal sectional view taken approximately on the line 4—4 of FIG. 3.

FIG. 5 is a sectional view, similar to FIG. 3, showing the feed means in a position corresponding to the machine as in FIG. 1.

FIG. 6 is a similar view of said feed means in still another position that corresponds to the machine in a position intermediate FIGS. 2 and 1.

FIG. 7 is a fragmentary and partly sectional view showing said feed means as seen in a plane normal to the plane of FIGS. 3, 5 and 6, in the position thereof as in FIG. 5.

FIG. 8 is a further enlarged vertical sectional view of a brewing or infusion means used in the invention.

The beverage-extracting and -dispensing machine that is illustrated comprises, generally, a vented hot water reserve supply tank 10, a hot water inlet 11 to the bottom of said tank provided with control valves 12 and 13, means 10a for controlling replenishment of evaporation in the tank 10, a hot water chamber 14 for dispensing water received from the supply tank, a check valve 14a controlling flow from the supply tank 10 to the chamber 14 and checking reverse flow, a displacement or dispensing piston 15 in the chamber 14 provided with a hollow stem 16, a power cylinder 17 connected in the inlet 11 between the valves 12 and 13 to receive hot water from said inlet when valve 12 is open, a piston 18 in said power cylinder and provided with a stem 19, the stems 16 and 19 being opposed and axially aligned, a two-part extraction or brewing chamber 20 partly carried by each stem 16 and 19, a check valve 20a controlling flow of water from the chamber 14 to said brewing chamber, and means 21, controlled by movement of said brewing chamber, for advancing the cartridges or pods P of a cartridge tape T of filter paper or fabric to intermittently bring pods successively into position in the brewing chamber as successive brewing cycles are carried out.

The dispensing piston 15 and its stem 16, together with the upper part 22 of the brewing chamber 20, comprise a unitary element that is biased by a spring 23 in a direction toward the power cylinder 17. The power piston 18 and its stem 19, together with the lower part 24 of the brewing chamber, comprise a unitary element that is biased in the same direction by a spring 25.

As shown best in FIG. 1, the brewing chamber part 22 has a bottom-open cavity 27 that is surrounded by a sealing gasket 26; somewhat similarly, the brewing chamber part 24 has a top-open cavity 27a that is surrounded by a sealing gasket 28. Said gaskets are designed to impinge on opposite faces of the tape T with a pod P disposed in said cavity 27, 27a to completely seal around said cavity, the contents of the pod and hot water therein. A passage 29 in the part 24 and open to the cavity constitutes the only path of discharge of water that enters the cavity through the hollow stem 16, is infused with the essence or extract of the material in the pod, and after passing through the filter belt and pod P, enters said passage 29.

The valves 12 and 13 may be manually controlled valves or, without invention may be electrically controlled. Also, these two valves may be combined as a single three-way valve. In any case, the present machine would function in the following manner, it being understood that the inlet 11 is connected to a hot water source having a regulated line pressure of sufficient force to act against the bias of both springs 23 and 25.

With valve 12 open and valve 13 closed, as in FIG. 1, the chamber 14, between the check valves 14a and 20a, filled with hot water, and a pod P positioned between the separated brewing chamber parts 22 and 24, as in FIG. 3, hot water, under line pressure in inlet 11, enters the power cylinder 17, forcing the piston 18 upwardly against the bias of spring 25 until the chamber gaskets 26 and 28 of the parts 22 and 24 clamp against the opposite sides of the tape T. Until such closing of the brewing chamber 20 is achieved, the spring 23 maintains the piston 15 in the extended position of FIG. 2.

Upon continued flow of pressure water into the power cylinder, the force thereof will act, against the bias of spring 23, to push the piston 15 upwardly into the chamber 14. This pressure will force the check valve 14a closed and will cause a displacement of the hot water in said chamber, through the stem 16, and past the check valve 20a, into the brewing chamber cavity 27, 27a, through the pod P in said cavity and, in a dispensing flow, brewed material from the passage 29. The volume of liquid thus dispensed varies according to the power stroke imparted to the piston 15. One or more pre-set stops (not shown) may be provided to limit such stroke, as desired, thereby providing a selective volume control. At the end of the brewing cycle, the power cylinder contains a volume of hot water that was increased from its initial volume by an amount equal to the amount of liquid that was dispensed through passage 29.

The machine is re-set to initial position by closing of the valve 12 and then opening of valve 13. The spring 23 will now act to project the brewing chamber part 22 and the piston 15 to their initial positions, while the spring 25 is causing retraction of the lower chamber part 24 and the piston 18 to their initial positions, as in FIG. 2. This return action forces water from cylinder 17 into the vented cylinder 10 and past the check valve 14a into chamber 14 to replenish the water dispensed therefrom during the brewing cycle. Since the tank 10 is vented, the pressure of the water in chamber 14 is the same as in said tank and can easily be retained by the check valve 20a. By provision of a stop (not shown) for the piston 18 at its low, retracted position of FIG. 2, the volume of water displaced thereby past the valve 13 may be identical to the dispensed volume, as above explained. The valve 13 may remain open or be closed when the flow to the reserve tank 10 has stopped upon stopping of retraction of the piston 18, but should be in closed position before valve 12 is opened to start a power-operated brewing cycle.

From the foregoing it will be seen that the complete cycle of operation is carried out wholly by the hydraulic power provided by the hot water supply and that the amount of beverage dispensed can be pre-set merely by mechanical limitation of movement of the two pistons 15 and 18. Auxiliary electric power is needed only in cases where the valves 12 and 13 are to be pushbutton or automatically controlled.

Evaporation may occur in tank 10. In any of several known ways, the float means 10a is provided to simultaneously open both valves 12 and 13 so that inlet water may replenish the tank. Since the tank 10 is vented, the pressure of this water will not be effective to project the piston 18 against the bias of the spring 25. Of course, the tank 10 may be replenished in other ways to restore water lost by evaporation.

The tape-advancing means 21, shown in FIGS. 3 to 7, is mounted on the wall 30 of the chamber 14 and is cocked by the brewing chamber 20 during movement thereof during brewing and dispensing, and is moved in a direction to advance the next pod P of the tape to replace in brewing position the pod from which the essence has been extracted.

Said means 21 comprises a mounting frame 31 that is fixedly secured to said wall 30 and is provided with a drive lug 32 and with a pair of vertical guide rods 33; a floating hub 34 provided with ears 35 slidingly engaged with said rods and biased by springs 36 in a downward direction toward stop lugs 37 on said mounting frame 31; an axle 38 extending horizontally from said floating hub 34; a spur gear 39 rotational on said axle and affixed to a disc 40 provided with a set of drive fingers 41 (in this case, seven) extending horizontally past the axis of the brewing chamber 20 and of sufficient length to form members to engage and support the tape T in an arcuate arrangement of the pods P thereof around the axis of the axle 38; a drive lever 42 also rotational on the axle 38 with an end 43 in drive engagement with lug 32 and its opposite end mounting a spur pinion 44 in mesh with the gear 39; a ratchet wheel 45 affixed to and rotational with the pinion 44; a spring-detent lock dog 46 carried by said opposite end of lever 42 extending generally perpendicularly from said lever and being in operative engagement with the ratchet wheel 45, acting as a pawl in conjunction therewith to permit rotation thereof in one direction and lock the same against rotation in the opposite direction; and a spring 47 to bias the arm 42 in a direction to cause feed movement of the wheel 40 and, thus, feed of the tape T.

The drive fingers 41 are provided with two sets of sprocket projections 48 that engage in holes 49 provided in the tape T midway between the pods P thereof. Therefore, the pods, in their arrangement around the axle 38, are centered between the drive fingers 41.

The lug 32, drive finger 43 and ratchet wheel 45 are so relatively oriented that two adjacent drive fingers 40 assume and are locked in straddling position between the brewing chamber parts 22 and 24 and equally on both sides of the axis thereof, in the manner shown in the drawings. In this manner, a pod P, as in FIG. 3, is in position to be engaged by said parts 22 and 24 and to be enclosed therein, as shown in FIG. 8.

It will be noted that the drive fingers 41 are spaced a distance smaller than the outer diameter of the parts 22 and 24. One, as shown, or both said parts may be chamfered at 50 to accommodate said fingers.

A backlash-preventing stop 51 on the floating wheel hub 34 is engaged with the periphery of the ratchet wheel to prevent overrun of the action.

FIG. 3 shows spring 23 extended and the chamber part 24 approaching the pod P that is in operative position. When said part 24 encounters the fingers 41 on opposite sides of said pod, during the power stroke of the machine, said fingers, wheel 40, floating hub 34, and all parts of the latter, will be moved upward bodily until the two brewing chamber parts 22 and 24 close over the pod, as shown in FIG. 8. As the power stroke continues, the spring 23 is compressed to move the piston 15 in a liquid-displacing direction. During such movement, the lever 42 is rocked against the energy of spring 47 because of the engagement of the end 43 with the fixed lug 32. Since the wheel 40 is held against rotation because of the two fingers 41 thereof that are in driving engagement with the parts 22 and 24, the pinion 44 will roll around the gear 39 as the lever 42 is rocked from the position of FIG. 3 to the end-cocked position of FIG. 5, wherein the springs 36 are compressed to store wheel-driving energy. This rotation of the pinion causes a like advance of the ratchet wheel away from stop 51 to bring the next tooth, of the three teeth shown, into locking engagement with the lock dog 46. During the entire power cycle, the tape T is motionless.

When the brewing chamber part 24 starts downwardly at the end of the power cycle, the energy stored in the springs 36 moves the floating hub 34 downwardly also. At this time, the spring 23 is also expanding, keeping the brewing chamber 20 closed over the pod from which the essence has been extracted. When the chamber part 22 has moved to its lowermost position, the springs 36 will still be effective to return the hub 34 to its initial position. During such movement of the hub, and when the drive fingers 41 start to move away from the now stationary chamber part 22, the energy stored in spring 47 becomes effective to return the lever to initial position, since the end 43 of the lever is free of lug 32. FIG. 6 shows this drive position in which the dog 46 holds the pinion 44 against rotation on its axis. The pinion 39 and gear being locked by said dog, the wheel 40 is rotated to advance the next pod P of the tape T to the position vacated by the used-up pod.

Thus, each cycle of operation automatically causes an advance of the tape T and the positioning of a new pod P for incorporation in the two-part brewing or infusion chamber 20.

It will be noted that the operation is independent of whether the water is heated or not, but the reserve tank 10 and/or the chamber 14 may be provided with means to heat the water therein so that a suitably hot beverage will be dispensed.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A beverage-extracting and -dispensing machine comprising
   (a) an inlet from a source of water under regulated pressure,
   (b) a vented reserve tank and a power cylinder connected to said inlet,
   (c) valve means in the inlet to control inlet flow, selectively, into the power cylinder and into the reserve tank, and from the power cylinder to the reserve tank,
   (d) a water chamber connected to and receiving water from the reserve tank,
   (e) a check valve controlling flow to the water chamber and preventing back flow,
   (f) a hollow piston in said chamber,
   (g) a power piston in said power cylinder,
   (h) each said piston being provided with a spring biasing the same in the same direction, and
   (i) a two-part brewing chamber with one part connected to the hollow piston and the other part connected to the power piston and forming the brewing chamber when the two pistons are brought together, one said part having an outlet, said brewing chamber being closed under pressure of water from the inlet and moved against the bias of said spring by said pressure to displace water from the water chamber, through the hollow piston, into the brewing chamber and therethrough, through the dispensing outlet.

2. A beverage-extracting and -dispensing machine comprising
   (a) an inlet from a source of water under regulated pressure,
   (b) a vented reserve tank and a power cylinder connected to said inlet,
   (c) valve means in the inlet to control inlet flow, selectively, into the power cylinder and into the reserve tank, and from the power cylinder to the reserve tank,
   (d) a water chamber connected to and receiving water from the reserve tank,
   (e) a check valve for controlling flow to the water chamber and preventing back flow,
   (f) a hollow piston in said chamber,
   (g) a power piston in said power cylinder,
   (h) each said piston being provided with a spring biasing the same in the same direction, and
   (i) a two-part brewing chamber with one part connected to the hollow piston and the other part connected to the power piston and forming the brewing chamber when the two pistons are brought together, one said part having an outlet, said brewing chamber being closed under pressure of water from the inlet and moved against the bias of said spring by said pressure to displace water from the water chamber, through the hollow piston, into the brewing chamber and therethrough, through the dispensing outlet, said spring of the power piston biasing the latter in a direction to displace water from the power cylinder into the reserve tank when the valve means is closed to inlet flow.

3. A beverage-extracting and -dispensing machine according to claim 2 in which the hollow piston is provided with a check valve for checking back flow from the brewing chamber to the water chamber and has a greater biasing closing force than that of the check valve that controls back flow to the reserve tank.

4. A beverage-extracting and -dispensing machine according to claim 2 in which the brewing chamber is provided with a water-pervious pod filled with essence-containing material, and feed means for operation by one of said pistons, during movement thereof, and by one of said piston-biasing springs, to feed said pod into and out of the brewing chamber.

5. A beverage-extracting and -dispensing machine according to claim 4 in which a tape connects a plurality of pods in an elongated series arrangement, said feed means comprising
   (a) a wheel with an axle and circumferentially arranged drive pins around which said tape is trained with the pods disposed between adjacent pins, the pins adjacent to the pod in the brewing chamber being engaged with one of the chamber parts to move the wheel bodily during movement of the brewing chamber in a direction to store energy in the two mentioned piston-biasing springs,
   (b) a member mounting the wheel axle,
   (c) spring means compressed by said member when moved by said drive pins,
   (d) means carried by said member and movable around the axle of the wheel to cock the wheel preparatory to feed movement thereof,
   (e) means operative under expansion force of the spring of the hollow piston and the mentioned compressed spring means for biasing the wheel-mounting member in a direction to return the wheel to a position wherein the drive pins thereof are spaced from the brewing chamber parts, and
   (f) spring-biased means to rotate the cocked wheel to feed the next pod on the tape into register between the separated parts of the brewing chamber.

6. A beverage-dispensing machine comprising
   (a) a vented reserve supply tank,
   (b) a water chamber connected to receive water from said tank with a check valve to prevent backflow of water to the tank,
   (c) a hollow piston in said chamber with an outlet having a backflow-preventing check valve,
   (d) a brewing chamber part on the discharge end of said hollow piston,
   (e) a spring normally biasing said hollow piston in a direction to allow filling of the water chamber from the reserve tank,
   (f) a power cylinder,
   (g) a piston in said power cylinder,
   (h) a spring to bias said piston in the same direction as the hollow piston,
   (i) a brewing chamber part aligned with and opposed to the mentioned chamber part and carried by the latter piston,
   (j) one of said chamber parts having a dispensing outlet, and
   (k) a valve-controlled water supply under pressure greater than the pressure in the reserve tank to first direct supply water to the power cylinder to project the piston therein against the bias of its spring, bring the brewing chamber parts into engaged chamber-closing position, and move the hollow piston against the bias of its spring to a position displacing water from the water chamber into and through the brewing chamber.

7. A beverage-dispensing machine comprising
   (a) a vented reserve supply tank,
   (b) a water chamber connected to receive water from said tank with a check valve to prevent backflow of water to the tank,
   (c) a hollow piston in said chamber with an outlet having a backflow-preventing check valve,
   (d) a brewing chamber part on the discharge end of said hollow piston,
   (e) a spring normally biasing said hollow piston in a direction to allow filling of the water chamber from the reserve tank,
   (f) a power cylinder,
   (g) a piston in said powder cylinder,
   (h) a spring to bias said piston in the same direction as the hollow piston,
   (i) a brewing chamber part aligned with and opposed to the mentioned chamber part and carried by the latter piston,
   (j) one of said chamber parts having a dispensing outlet, and
   (k) a valve-controlled water supply under pressure greater than the pressure in the reserve tank to first direct supply water to the power cylinder to project the piston therein against the bias of its spring, bring the brewing chamber parts into engaged chamber-closing position, and move the hollow piston against the bias of its spring to a position displacing water from the water chamber into and through the brewing chamber,
   (l) said latter means being adjustable to close the water supply to the power cylinder and to open the latter for discharge into the reserve tank under bias of the spring that biases the power piston.

8. A beverage-dispensing machine comprising
   (a) a beverage-brewing means including at least two engageable parts forming a brewing chamber when engaged and means to introduce brewable material into such chamber,
   (b) means to supply water under pressure,
   (c) hydraulic means under force of said water to operate the brewing means,
   (d) a vented reserve tank for supplying water to the brewing means,
   (e) control means to close the water supply and open the hydraulic means to the reserve tank, and
   (f) spring means energized by the hydraulic means during a brewing operation to displace the water from the hydraulic means into the reserve tank.

9. A beverage-dispensing machine comprising
   (a) a beverage-brewing means,
   (b) means to supply water under pressure,
   (c) hydraulic means under force of said water to operate the brewing means,
   (d) a vented reserve tank for supplying water to the brewing means,
   (e) control means to close the water supply and open the hydraulic means to the reserve tank,
   (f) spring means energized by the hydraulic means during a brewing operation to displace the water from the hydraulic means into the reserve tank,
   (g) said brewing means being movable in one direction under force of the hydraulic means and in the return direction, in part, by said spring means, and
   (h) means controlled by said brewing means during movement thereof to successively feed pods of essence-provided material to said brewing means.

10. In a machine for brewing successive portions of a beverage from a ribbon having longitudinally spaced, water pervious compartments containing the material from which the beverage is to be extracted, by flowing water through successive ones of said compartments at a brewing station, the combination of:
    (a) a first head in said brewing station and engageable with one side of said ribbon around a said compartment in said brewing station, said first head being provided with a first water passage adapted to communicate with a said compartment in said brewing station;
    (b) a second head in said brewing station and engageable with the other side of said ribbon around a said compartment in said brewing station, said second head being axially movable toward said first head to clamp said ribbon between said heads, around a said compartment in said brewing station, said second head being provided with a second water passage therethrough adapted to communicate with a said compartment in said brewing station;
    (c) means for axially moving said second head toward and away from said first head and into clamping engagement with said ribbon around a said compartment therebetween;
    (d) rotary ribbon advancing means angularly displaceable in a step-by-step manner for advancing successive ones of said compartments into said brewing station and between said heads;
    (e) means for rotating said advancing means one step for each reciprocatory movement of said second head;
    (f) water heating means connected to said first passage;
    (g) valve means carried by said first head for controlling flow through said first passage and movable to an open position in response to clamping of said ribbon between said first and second heads for flowing water from said first passage through a said compartment clamped between said heads into said second passage to extract the beverage from the material in such compartment; and
    (h) said first head being mounted on said water heating means so that said first head is maintained at an elevated temperature by conduction of heat from said water heating means.

References Cited

UNITED STATES PATENTS 3,024,720  3/1962  Welsh _____ 100—266 X
3,143,955  8/1964  Rockwell _____ 99—289

FOREIGN PATENTS 1,238,694  7/1960  France.
  448,358  5/1949  Italy.
  485,560  10/1953  Italy.

WALTER A. SCHEEL, *Primary Examiner.*

ROBERT E. PULFREY, J. D. MEW, J. D. BEIN,
*Assistant Examiners.*

UNITED STATES PATENT OFFICE
CERTIFICATE OF CORRECTION

Patent No. 3,327,614                                June 27, 1967

Thomas K. Bridges et al.

It is certified that error appears in the above identified patent and that said Letters Patent are hereby corrected as shown below:

In the heading to the printed specification, lines 4 to 6, "Thomas K. Bridges, 3703 W. 102nd St., and Howard G. Nourse, 2402 W. 115th Place, both of Inglewood, Calif. 90303" should read -- Thomas K. Bridges, Inglewood, Calif. (4387 West 137th St. Apt. B Hawthorne, Calif. 90250) and Howard G. Nourse, Inglewood, Calif. (4024 Via Pima Palos Verdes Estates, Calif. 90275) --.

Signed and sealed this 12th day of August 1969.

(SEAL)
Attest:

Edward M. Fletcher, Jr.                         WILLIAM E. SCHUYLER, JR.
Attesting Officer                                     Commissioner of Patents